March 28, 1950 N. I. KORMAN 2,502,095

PHASE MODULATION

Original Filed Aug. 25, 1943

INVENTOR
NATHANIEL I. KORMAN
BY H. S. Grover
ATTORNEY

Patented Mar. 28, 1950

2,502,095

UNITED STATES PATENT OFFICE 2,502,095

PHASE MODULATION

Nathaniel I. Korman, Camden, N. J., assignor to Radio Corporation of America, a corporation of Delaware Original application August 25, 1943, Serial No. 499,905. Divided and this application September 5, 1946, Serial No. 695,008

6 Claims. (Cl. 332—23)

Figure 1:
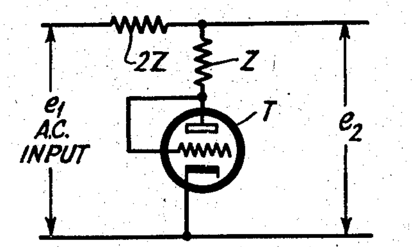

This application concerns a new and improved voltage phase shifting system. The system of this invention is of use as a static phase shifter and as the modulator in a phase or frequency modulation system wherein the phase or frequency shift is in accordance with signals.

An object of the invention is to provide a modulator capable of greater phase deviation than is attainable in known systems, and hence to make it possible to use in the system fewer multiplier stages.

Where a large amount of frequency multiplication is used the final output has, in addition to the main frequency selected for use, a large number of harmonics of the oscillator frequency. An advantage of my system is the reduction of harmonics in the output of the system by producing in the modulator a greater phase deviation, so that less multiplication is required in the following stages.

Another object of this invention is to provide in a modulation system of this type a greater phase deviation of wave energy in accordance with signals, and to accomplish this object without causing appreciable amplitude modulation of the wave energy. This is accomplished in my system by the use of a differential modulation system wherein the amplitude variations are opposed to cancel.

If alternating voltage is applied to a reactance, a second reactance of opposite sign and half the value of the first reactance and a resistance, in series, a voltage is derived across the second reactance and resistance of an amplitude equal to the amplitude of the first voltage and of a phase which with respect to the phase of the first voltage depends on the size of the resistance. By varying the resistance the phase of the second voltage changes, and a phase change of about 180° is obtainable. I make use of this principle to provide a static phase changer or a wave length modulator, in which case the resistance is a tube.

If a second resistance of opposite sign is put in parallel with the first resistance the phase shift is doubled. To explain briefly how I accomplish this, assume the first resistance is positive and comprises a tube. I place a second tube in parallel thereto and apply the alternating voltage to its grid in phase opposition with respect to the phase of the voltage on the first tube, so that the second tube appears as a negative resistance. These tubes are now differentially modulated and the phase is shifted about twice as much as in the single tube case, i. e., about 360 degrees. These features are claimed in this application which is a division of my U. S. application, Serial #499,905, filed August 25, 1943, now Patent No. 2,430,126, dated November 4, 1947, wherein the principle employed above is also applied to other phase modulators wherein the phase shift is obtained by varying a tube resistance.

It will be at once apparent, that, as in the single tube arrangements, the phase only of the voltage is varied, the amplitude remaining constant.

An advantage which flows from the use of my improved arrangement using two tubes is that less multiplication is necessary to get the final phase shift desired, and this in turn reduces the harmonic components in the final output which result from the use of a large amount of multiplication.

Figure 2:
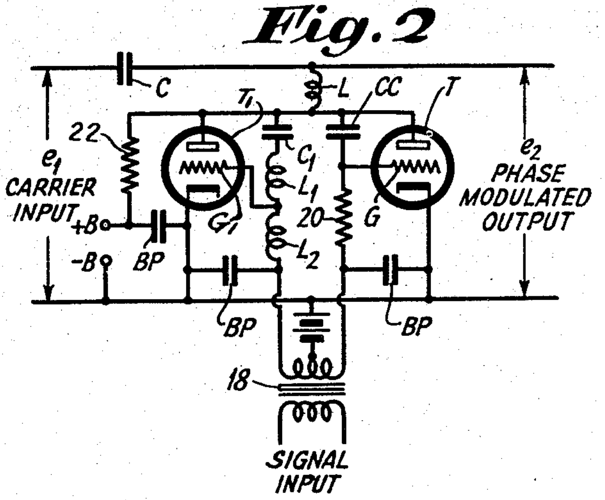

In describing my invention reference will be made to the attached drawings, wherein Fig. 1 illustrates diagrammatically a simple phase shifting circuit used to explain the principle involved in my improved phase shifter and modulator. Fig. 2 illustrates an embodiment of my improved phase shifter and timing modulation system as described briefly above; while Figures 2*a*, 2*b*, 2*c*, 2*d* and 2*e* are basic circuits or graphs illustrating the operation of the modification shown in Figure 2.

In Fig. 1, an alternating voltage $e_1$ of carrier frequency is applied across 2Z and the tube T cathode. 2Z is a reactance which may be capacitive or inductive in nature, while −Z is a reactance of opposite sign. The magnitude of 2Z is twice that of −Z. T which represents a variable resistance, is an electron discharge device having its anode and control grid excited by voltages of the same phase and its cathode connected to the other side of the input circuit. $e_2$ is the phase shifted or phase modulated voltage derived from the system. For the sake of simplicity, direct current circuits have been omitted in this figure, but it will be understood that the plate of the tube T may be charged through a radio frequency choke connected thereto, and to a source of direct current, while the grid may likewise be biased through a radio frequency choke, and modulating potentials may be applied through this choke to the said grid.

Fig. 1 shows a simple phase changer or modulator. Since the alternating current plate and grid voltages on the tube T are equal the admittance of the tube is readily seen to be $$Y=\frac{ip}{ep}=g+\frac{1}{R}=g\left(1+\frac{1}{u}\right) \qquad (1)$$

(where $g$, R, and $u$ are the transconductance, plate resistance, and amplification factor of the tube respectively). The ratio of output to input voltage for Fig. 1 is seen to be $$\frac{e2}{e1}=\frac{\frac{1}{Y}-Z}{2Z-Z+\frac{1}{y}}=\frac{1-YZ}{1+YZ}=\frac{1-gZ\left(1+\frac{1}{u}\right)}{1+gZ\left(1+\frac{1}{u}\right)} \quad (2)$$

If Z is taken as a reactance we see that $e_2$ is shifted in phase from $e_1$ but that both have the same amplitude. Also, if the magnitude of $g$ is varied (by varying the grid bias on the tube, for instance) the phase shift between $e_2$ and $e_1$ will vary. If audio voltages are applied to the grid of the tube the carrier voltage $e_2$ will be phase modulated in accordance with the audio voltage.

The variation in $g$ will, at most, be from zero to infinity. The variation in phase of $e_2$ will therefore, at most, be from zero to 180 degrees, or ± 90°. If $g$, however, could be varied from minus infinity through zero to plus infinity the phase would be varied from minus 180° to plus 180°. This can be accomplished by paralleling the tube in Fig. 1 by another tube whose grid voltage is 180° out of phase with its plate voltage. Fig. 2 shows a circuit which accomplishes this. In the arrangement the control voltages on the tube electrodes must be pushpull also.

In the actual choice of circuit elements used in these two tube modifications care must be taken that they are not such as will make the circuit oscillate.

In Fig. 2 the direct current sources have again been omitted for the sake of simplicity, as have the cathode heating circuits. A second tube $T_1$ is coupled in parallel with the tube T and the control grid $G_1$ thereof excited in phase opposition by the radio frequency oscillations. The plates and grids are supplied with direct current potentials by resistances 20 and 22 of the proper value, resistances being preferable to choke coils in these systems.

In the arrangement of Fig. 2, 2Z is, for example, taken as a capacity C and −Z is taken as an inductance L. C1, L1, L2 are made small so that the grid G1 of tube T1 is excited by a voltage substantially 180° out of phase with respect to the voltage on the anode of this tube T1. CC is a coupling condenser such that the phase of the voltage of the grid G of tube T is substantially the same as the phase of the voltage on the anode of this tube T and the anode of tube T1. This condenser CC keeps the plate potential from reaching the grid G while condenser C1 in like manner keeps the direct current potential from reaching the grid G1 of tube T1. The voltages on the grids are made equal by properly dimensioning L1, L2, C1, CC and 20.

In this embodiment the modulating potentials are applied in pushpull relation to the control grids G and G1 of the tubes by a transformer. The total phase shift obtainable in this arrangement is about twice the phase shift obtainable in the single tube arrangement of Fig. 1, or about 360 degrees.

The modulation transformer 18 has its primary supplied with modulation currents and the terminals of its secondary winding coupled to the grids G and G1 by way of resistor 20 and inductor L2 and a point on its secondary winding connected through a bias source to the cathodes of the tubes. The plates are supplied with potential through a resistance 22. Resistances 20 and 22 are large enough not to shunt out the radio frequency alternating current. R. F. bypass condensers BP are connected between resistances 20 and 22 and the respective cathodes and between the lower end of L2 and the cathode of tube T1.

Since in my improved system one tube acts as a positive resistance and the other as a negative resistance, the problem of regeneration in the circuits and generation of oscillations at some frequency must be considered. The analysis may be carried out by applying the Nyquist regeneration theory as described in the Bell System Technical Journal, vol. 11, page 126.

LC (−Z and 2Z) resonates at $\sqrt{2f}$ ($f$=carrier frequency). L1, L2, and C1 are proportioned to make the grid voltages on G and G1 equal. The resonance of L1, L2, C1 is greater than $f$. L1, L2, and $$\frac{1}{C1}$$

are large compared to L and $$\frac{1}{C}$$

Figure 2A:
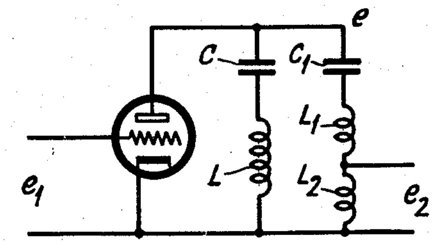

For purposes of analysing for oscillations tube T may be neglected and we may therefore consider the circuit of Fig. 2*a*.

Two cases are possible;

(I) The resonance of L1, L2, C1 is below that of LC.

(II) The resonance of L1, L2, C1 is above that of LC.

Figure 2B:
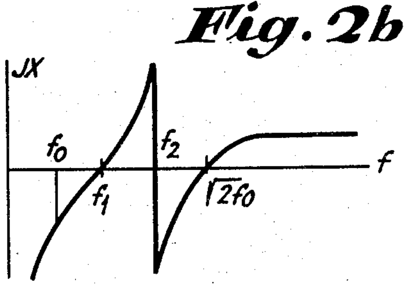
Figure 2C:
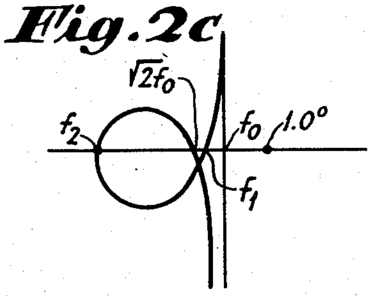
Figure 2D:
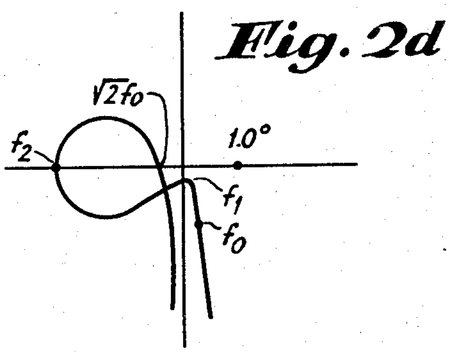

For case I:

The reactance seen by the plate of the tube is shown in Fig. 2*b*. The locus of the vector $e/e_1$ is shown in Fig. 2*c*. Since below $f1$, $e_2$ leads $e$ by 90°; above $f1$, $e_2$ is in phase with $e$; the locus of the vector $$\frac{e_2}{e_1}$$

is shown in Fig. 2*d*. The locus cannot include the point 1, 0 and therefore where the resonance of L1, L2, C1 is below that of LC this circuit cannot oscillate.

Figure 2E:
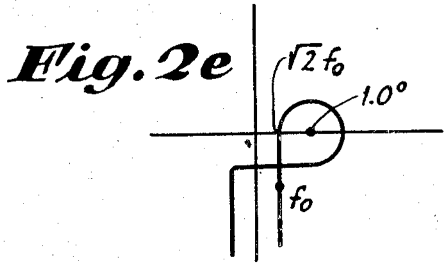

For case II:

By the same sort of an argument the locus of the vector $$\frac{e_2}{e_1}$$

is as shown in Fig. 2*e*. The locus can enclose the point 1, 0 and therefore under case II the circuit can oscillate.

Thus it is seen that the circuit illustrated in Fig. 2 will be stable in operation if the resonance of L1, L2, C1 is below that of LC, and will provide a total phase change of about 360°. The phase of $e_2$ may be displaced a fixed amount by properly biasing the tubes to thereby change their impedances. If modulating potentials are applied in push-pull, the system becomes a phase modulator.

What is claimed is:

1. In a circuit of the class described, two conductors having input and output terminals, means for impressing voltages of carrier wave frequency on said input terminals, a reactance in one of said conductors, a first variable resistance of positive sign and a second reactance in series across the said output terminals, a second variable resistance of negative sign connected in parallel to said first resistance, said resistances each comprising the impedance in a tube having an anode, a cathode and a control grid, connections for applying voltages substantially co-phasally to the tubes' anodes and substantially anti-phasally to the tubes' control grids, and connections to the tubes for varying said resistances differentially in accordance with control potentials to correspondingly vary the voltages at said output terminals.

2. In a circuit of the class described, two conductors having input and output terminals, means for impressing voltages of carrier wave frequency on said input terminals, a reactance in one of said conductors, a first variable resistance of positive sign, and a second reactance of half the magnitude of said first reactance in series across said output terminals, a second variable resistance of negative sign connected in parallel to said first resistance, and connections for varying said resistances differentially in accordance with control potentials to correspondingly vary the voltages at said output terminals.

3. In a system of the class described, a two-conductor line having input and output terminals, means for applying voltages of carrier frequency to said input terminals, a capacitor in one of said conductors, a first electron control device having the impedance between its output electrodes connected across said line at its output terminals, said connection including an inductor between said impedance and said one of said conductors, said device having a control electrode, a second electron control device having a control electrode and having the impedance between its output electrodes connected in parallel to the impedance between the output electrodes of said first device, circuits for applying voltages of said carrier frequency substantially in phase-opposed relation to the control electrodes of said devices, whereby one thereof operates as a negative impedance while the other thereof operates as a positive impedance, and connections for varying the impedances of said devices differentially in accordance with control potentials to correspondingly vary the phase of the voltages at said output terminals.

4. In a system of the class described, a two-conductor line having input and output terminals, means for applying voltages of carrier frequency to said input terminals, a reactance in one of said conductors, a first electron control device having the impedance between its output electrodes connected across said line at its output terminals, said connection including a second reactance of half the magnitude of said first reactance, said device having a control electrode, a second electron control device having a control electrode and having the impedance between its output electrodes connected in parallel to the impedance between the output electrodes of said first device, circuits for applying voltages of said carrier frequency substantially in phase-opposed relation to the control electrodes of said devices, whereby one thereof operates as a negative impedance while the other thereof operates as a positive impedance, and connections for varying the impedances of said devices differentially in accordance with control potentials to correspondingly vary the phase of the voltages at said output terminals.

5. In a system of the class described, a two-conductor line having input and output terminals, means for applying voltages of carrier frequency to said input terminals, a reactance in one of said conductors, a second reactance of half the magnitude of the first reactance, a first electron control device having the impedance between its output electrodes in series with said second reactance across said line at its output terminals, said device having a control electrode, a second electron control device having a control electrode and having the impedance between its output electrodes connected in parallel to the impedance between the output electrodes of said first device, circuits including phase shifting reactance for applying voltages of said carrier frequency substantially in phase-opposed relation to the control electrodes of said devices, whereby one thereof operates as a negative impedance while the other thereof operates as a positive impedance, and connections for varying the impedances of said devices differentially in accordance with control potentials to correspondingly vary the phase of the voltages at said output terminals.

6. In a phase modulation system, a pair of electron discharge tubes each having an output impedance and a control electrode, connections including the output impedances of said tubes in parallel, a first reactance, a second reactance of opposite sign and double the magnitude of said first reactance in a series circuit excited by carrier frequency voltages the phase of which is to be modulated, high frequency circuits for impressing said carrier frequency voltages from said series circuit substantially in phase opposed relation on the control electrodes of said tubes, and circuits for modulating the impedances of said tubes differentially in accordance with signals, whereby voltage of the carrier wave frequency correspondingly modulated in phase appears across said tube impedances and said first reactance in series.

NATHANIEL I. KORMAN.

REFERENCES CITED

The following references are of record in the file of this patent:

UNITED STATES PATENTS

| Number | Name | Date |
|---|---|---|
| 2,105,678 | Usselman | Jan. 18, 1938 |
| 2,143,386 | Roberts | Jan. 10, 1939 |
| 2,374,000 | Crosby | Apr. 17, 1945 |